United States Patent
Kim

(10) Patent No.: US 9,435,987 B2
(45) Date of Patent: Sep. 6, 2016

(54) ZOOM LENS AND ELECTRONIC DEVICE INCLUDING THE SAME

(71) Applicant: SAMSUNG ELECTRONICS CO., LTD., Suwon-si, Gyeonggi-do (KR)

(72) Inventor: Jin-woo Kim, Yongin-si (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 51 days.

(21) Appl. No.: 14/306,739

(22) Filed: Jun. 17, 2014

(65) Prior Publication Data
US 2015/0015956 A1  Jan. 15, 2015

(30) Foreign Application Priority Data
Jul. 9, 2013 (KR) .................. 10-2013-0080354

(51) Int. Cl.
G02B 27/64 (2006.01)
G02B 15/177 (2006.01)
G02B 9/34 (2006.01)

(52) U.S. Cl.
CPC ............... *G02B 15/177* (2013.01); *G02B 9/34* (2013.01); *G02B 27/646* (2013.01)

(58) Field of Classification Search
CPC ............ G02B 9/00; G02B 9/12; G02B 9/34; G02B 13/001; G02B 13/0015; G02B 13/002; G02B 13/004; G02B 13/18; G02B 15/14; G02B 15/16; G02B 27/64; G02B 27/646; G03B 2205/0007; H04N 5/23248
USPC ....... 359/554, 557, 676, 683, 686, 754, 771, 359/781, 783, 784; 396/52, 55; 348/208.99, 348/208.4
See application file for complete search history.

(56) References Cited

U.S. PATENT DOCUMENTS

| 7,339,747 | B2* | 3/2008 | Yamamoto | G02B 15/177 359/683 |
| 7,474,472 | B2* | 1/2009 | Hozumi | G02B 15/177 359/695 |
| 8,243,370 | B2 | 8/2012 | Ito | |
| 8,537,268 | B2 | 9/2013 | Iiyama et al. | |
| 8,736,972 | B2* | 5/2014 | Suzuki | G02B 15/177 359/681 |
| 2010/0149406 | A1* | 6/2010 | Katakura | H04N 5/2254 348/345 |
| 2010/0195216 | A1* | 8/2010 | Miyazaki | G02B 15/177 359/686 |
| 2011/0102640 | A1* | 5/2011 | Iiyama | G02B 13/18 348/240.3 |
| 2011/0109787 | A1* | 5/2011 | Iiyama | G02B 15/177 348/335 |
| 2011/0128418 | A1* | 6/2011 | Iiyama | G02B 15/177 348/240.3 |
| 2011/0261469 | A1 | 10/2011 | Arai | |
| 2011/0267704 | A1* | 11/2011 | Sado | G02B 15/177 359/680 |

FOREIGN PATENT DOCUMENTS

| JP | 2010-243637 A | 10/2010 |
| JP | 2011-232503 A | 11/2011 |
| JP | 5149382 B2 | 2/2013 |

* cited by examiner

*Primary Examiner* — Arnel C Lavarias
(74) *Attorney, Agent, or Firm* — Drinker Biddle & Reath LLP

(57) ABSTRACT

A zoom lens that includes, in order from an object side to an image side, a first lens group having a negative refractive power, a second lens group having a positive refractive power, a third lens group having a positive refractive power, and a fourth lens group having a positive refractive power, and when zooming from a wide angle position to a telephoto position, an interval between the first lens group and the second lens group decreases, an interval between the second lens group and the third lens group decreases, and an interval between the third lens group and the fourth lens group increases.

21 Claims, 16 Drawing Sheets (WIDE ANGLE POSITION)

(MIDDLE POSITION)

(TELEPHOTO POSITION)

(WIDE ANGLE POSITION)

(MIDDLE POSITION)

(TELEPHOTO POSITION)

ZOOM LENS AND ELECTRONIC DEVICE INCLUDING THE SAME

RELATED APPLICATIONS

This application claims the priority benefit of Korean Patent Application No. 10-2013-0080354, filed on Jul. 9, 2013, in the Korean Intellectual Property Office, the disclosure of which is incorporated herein in its entirety by reference.

BACKGROUND

1. Field

One or more embodiments relate to a small and bright wide-angle zoom lens.

2. Description of the Related Art

In electronic devices including photographing devices using a solid-state imaging device such as a digital camera, an interchangeable lens system, or a video camera, users require photographing devices having a high resolution and a high zooming magnification. In addition, since photographing devices using a solid-state imaging device are suitable for miniaturization, photographing devices have been recently used not only in mobile phones, but also in small information terminals such as personal digital assistants (PDA's), handheld computers, or tablet computers. Furthermore, the sophistication of consumers relating to photographing devices consistently increases, and developments relating to wide-angle zoom lens systems having a large diameter have been increasing in accordance with market demand. However, it is difficult to secure photographing devices that are made small and have high performance.

SUMMARY

One or more embodiments include a small and bright zoom lens.

One or more embodiments include an electronic device including a small and bright zoom lens.

Additional aspects will be set forth in part in the description which follows and, in part, will be apparent from the description, or may be learned by practice of the presented embodiments.

According to one or more embodiments, a zoom lens includes, in order from an object side to an image side: a first lens group having a negative refractive power; a second lens group having a positive refractive power; a third lens group having a positive refractive power; and a fourth lens group having a positive refractive power. When zooming from a wide angle position to a telephoto position, an interval between the first lens group and the second lens group decreases, an interval between the second lens group and the third lens group decreases, and an interval between the third lens group and the fourth lens group increases. The second lens group includes, in a sequence from the object side, a positive lens, a positive lens, a positive lens, and a negative lens. The zoom lens satisfies the following expression:

$$0.3 \le wFno^*fw/f2 \le 1.25$$

where, f2 denotes a focal length of the second lens group, fw denotes a focal length of the whole zoom lens at the wide angle position, and wFno denotes an F number at the wide angle position.

The first lens group may include one or more negative lenses, and at least one of the one or more negative lenses may satisfy the following expression:

$$60 \le 1Vd \le 100$$

where, 1Vd denotes an Abbe number of at least one of the one or more negative lenses of the first lens group.

The zoom lens may satisfy the following expression:

$$1.7 \le f3/fw \le 21.5$$

where, f3 denotes a focal length of the third lens group, and fw denotes a focal length of the whole zoom lens at the wide angle position.

The fourth lens group may satisfy the following expression:

$$2.9 \le f4/fw \le 12$$

where, f4 denotes a focal length of the fourth lens group, and fw denotes a focal length of the whole zoom lens at the wide angle position.

The first lens group may include a positive lens, and a refractive index of the positive lens may satisfy the following expression:

$$1.9 \le 1Nd$$

where, 1Nd denotes a d-line refractive index of the positive lens of the first lens group.

The second lens group may include an aspherical lens having a meniscus shape with a convex surface facing toward the object side.

The second lens group may include a cemented lens.

The third lens group may include an aspherical lens having a positive refractive power.

The third lens group may perform correction of vibration.

The third lens group may include an aperture diaphragm.

The third lens group and the aperture diaphragm may move in the same trajectory during zooming.

The first lens group may include a first negative lens, a second negative lens, and a positive lens.

The first negative lens of the first lens group may be an aspherical lens.

The third lens group may include a negative lens and a positive lens.

The third lens group may include one positive lens.

The fourth lens group may include an aspherical lens having a positive refractive power.

The fourth lens group may include a meniscus lens with a convex surface facing toward the object side.

The fourth lens group may perform focusing.

According to one or more embodiments, a photographing device includes a zoom lens and an imaging element that receives an image formed by the zoom lens. The zoom lens includes, in order from an object side to an image side, a first lens group having a negative refractive power, a second lens group having a positive refractive power, a third lens group having a positive refractive power, and a fourth lens group having a positive refractive power. When zooming from a wide angle position to a telephoto position, an interval between the first lens group and the second lens group decreases, an interval between the second lens group and the third lens group decreases, and an interval between the third lens group and the fourth lens group increases. The second lens group includes, in a sequence from the object side, a positive lens, a positive lens, a positive lens, and a negative lens. The zoom lens may satisfy the following expression:

$$0.3 \le wFno^*fw/f2 \le 1.25$$

where, f2 denotes a focal length of the second lens group, fw denotes a focal length of the whole zoom lens at the wide angle position, and wFno denotes an F number at the wide angle position.

The first lens group may include one or more negative lenses, and at least one of the one or more negative lenses may satisfy the following expression:

$$60 \leq 1Vd \leq 100$$

where, 1Vd denotes an Abbe number of at least one of the one or more negative lenses of the first lens group.

The zoom lens may satisfy the following expression:

$$1.7 \leq f3/fw \leq 21.5$$

where, f3 denotes a focal length of the third lens group, and fw denotes a focal length of the whole zoom lens at the wide angle position.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
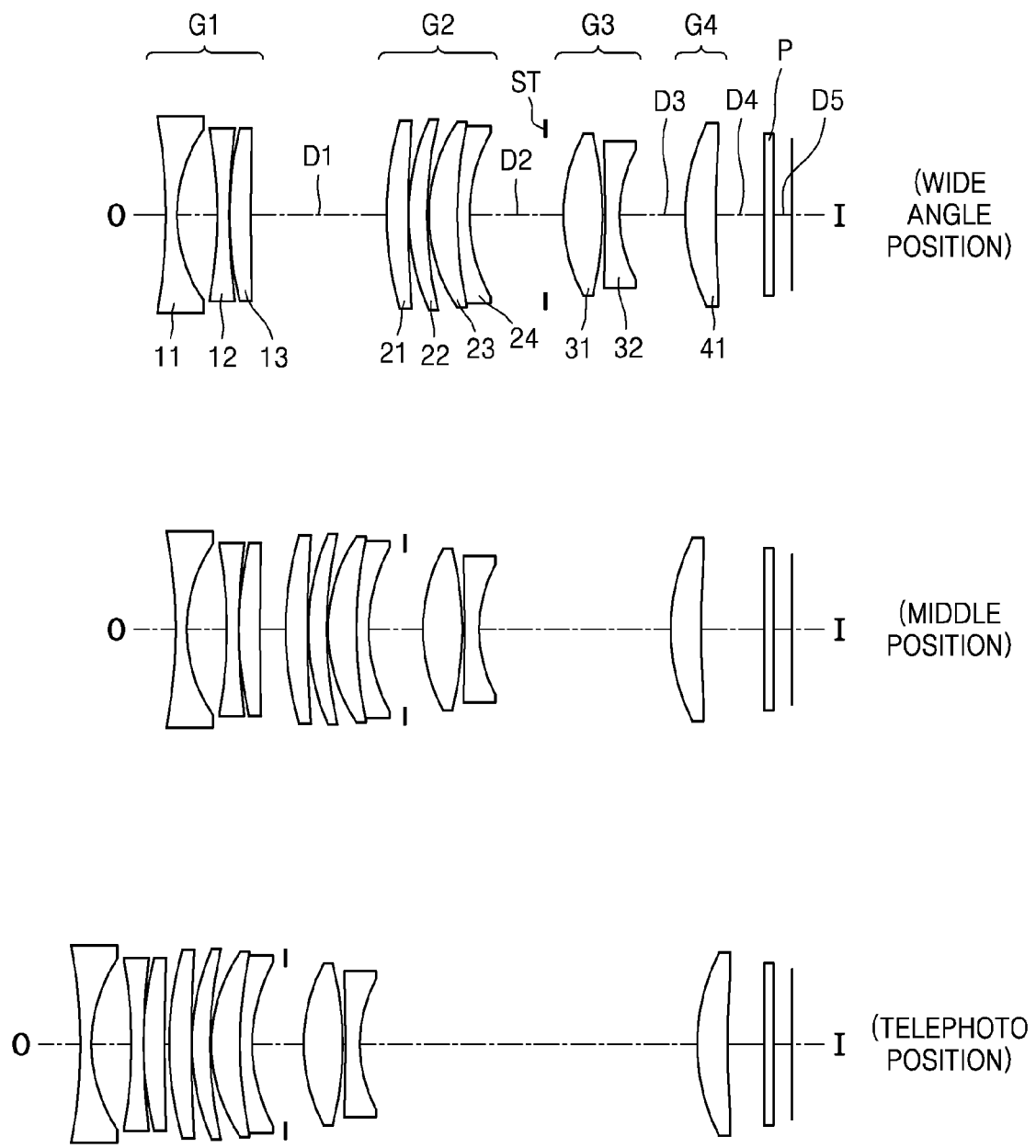
FIG. 1 is a diagram illustrating a wide angle position, a middle position, and a telephoto position of a zoom lens according to a first embodiment.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects thereof. Expressions such as "at least one of," when preceding a list of elements, modify the entire list of elements and do not modify the individual elements of the list.

FIG. 1 is a diagram illustrating a wide angle position, a middle position, and a telephoto position of a zoom lens according to a first embodiment. Referring to FIG. 1, the zoom lens includes, in order from an object side O to an image side I, a first lens group G1 having a negative refractive power, a second lens group G2 having a positive refractive power, a third lens group G3 having a positive refractive power, and a fourth lens group G4 having a positive refractive power. When zooming from a wide angle position to a telephoto position, an interval between the first lens group G1 and the second lens group G2 may be reduced, and an interval between the third lens group G3 and the fourth lens group G4 may be increased.

The first lens group G1 may include at least one negative lens. For example, the first lens group G1 may include a first negative lens 11, a second negative lens 12, and a third positive lens 13. The first lens group G1 may include at least one aspherical lens. For example, the first negative lens 11 of the first lens group G1 may be an aspherical lens. The first negative lens 11 may be a biconcave lens or a meniscus lens having a concave surface facing the object side O. The first lens group G1 has a negative refractive power, and thus it is easy to control aberration due to a wide angle, and the zoom lens may be reduced in size.

The second lens group G2 may include, for example, four lenses. The second lens group G2 may include, for example, a fourth positive lens 21, a fifth positive lens 22, a sixth positive lens 23, and a seventh negative lens 24 that are sequentially disposed from the object side O. The second lens group G2 includes four lenses, thereby allowing a bright zoom lens to be realized. The second lens group G2 may control spherical aberration and lateral aberration which occur as a light flux increases.

Figure 9:
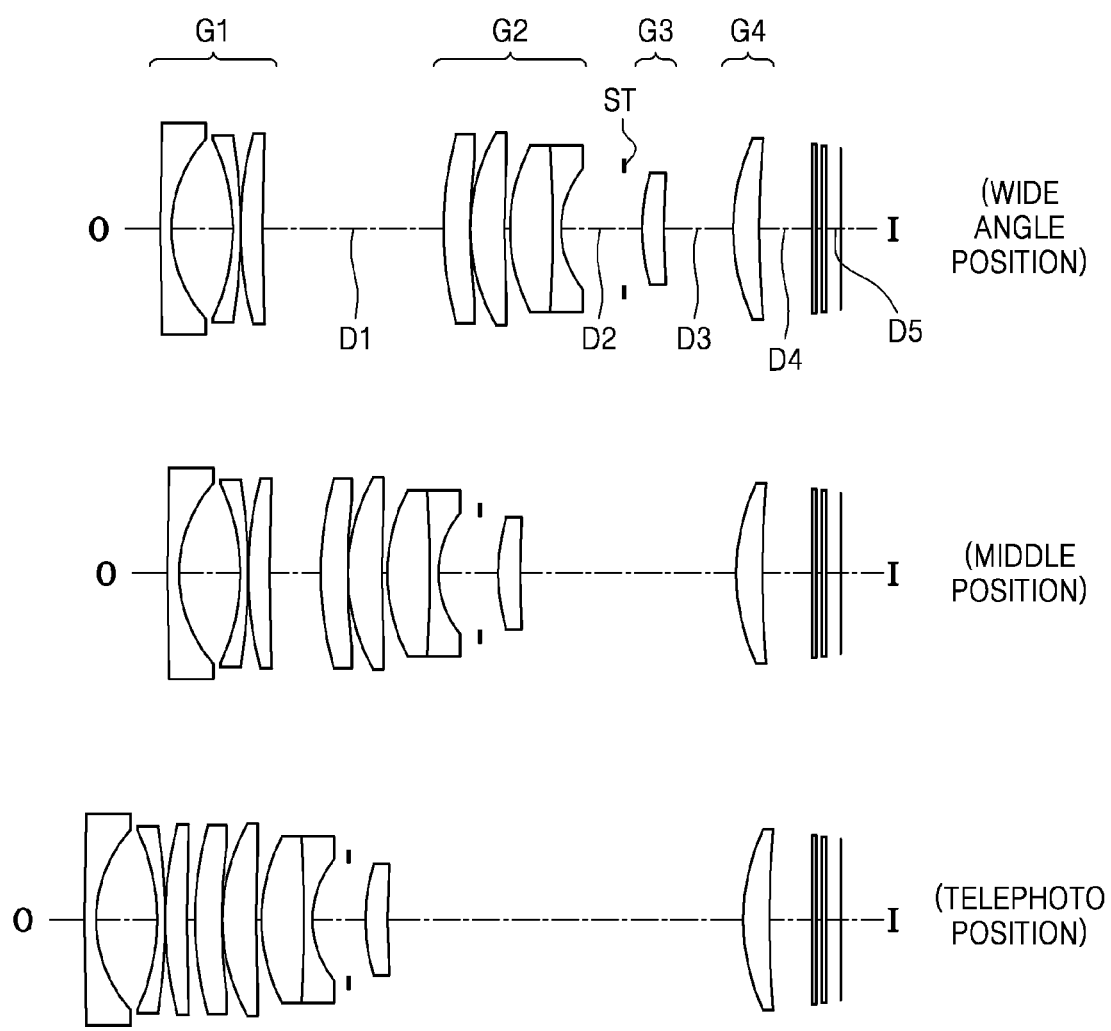
FIG. 9 is a diagram illustrating a wide angle position, a middle position, and a telephoto position of a zoom lens according to a fifth embodiment.
Figure 10A:
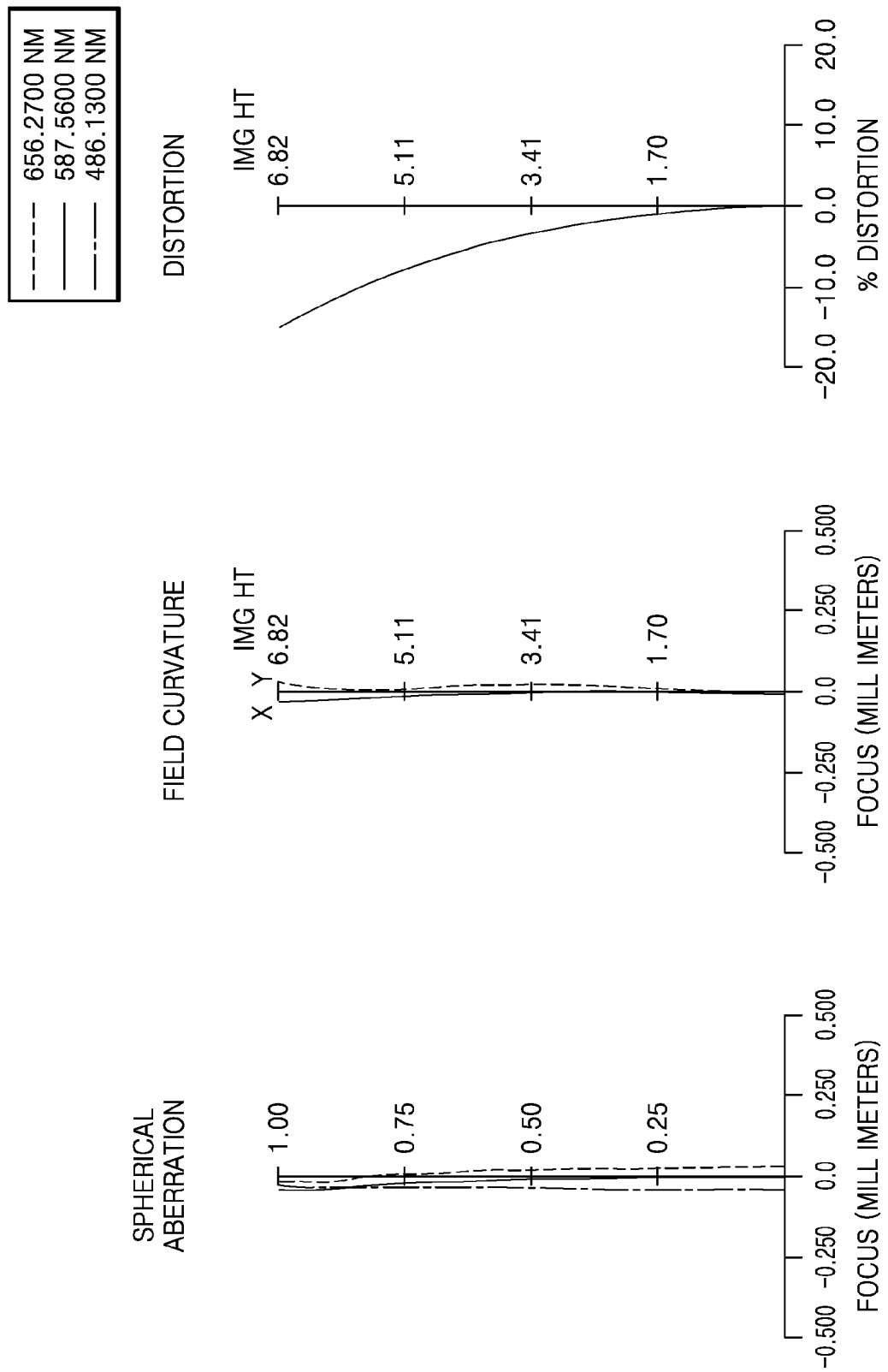
FIGS. 10A and 10B are aberration diagrams illustrating aberration at the wide angle position and the telephoto position of the zoom lens according to the fifth embodiment.
Figure 10B:
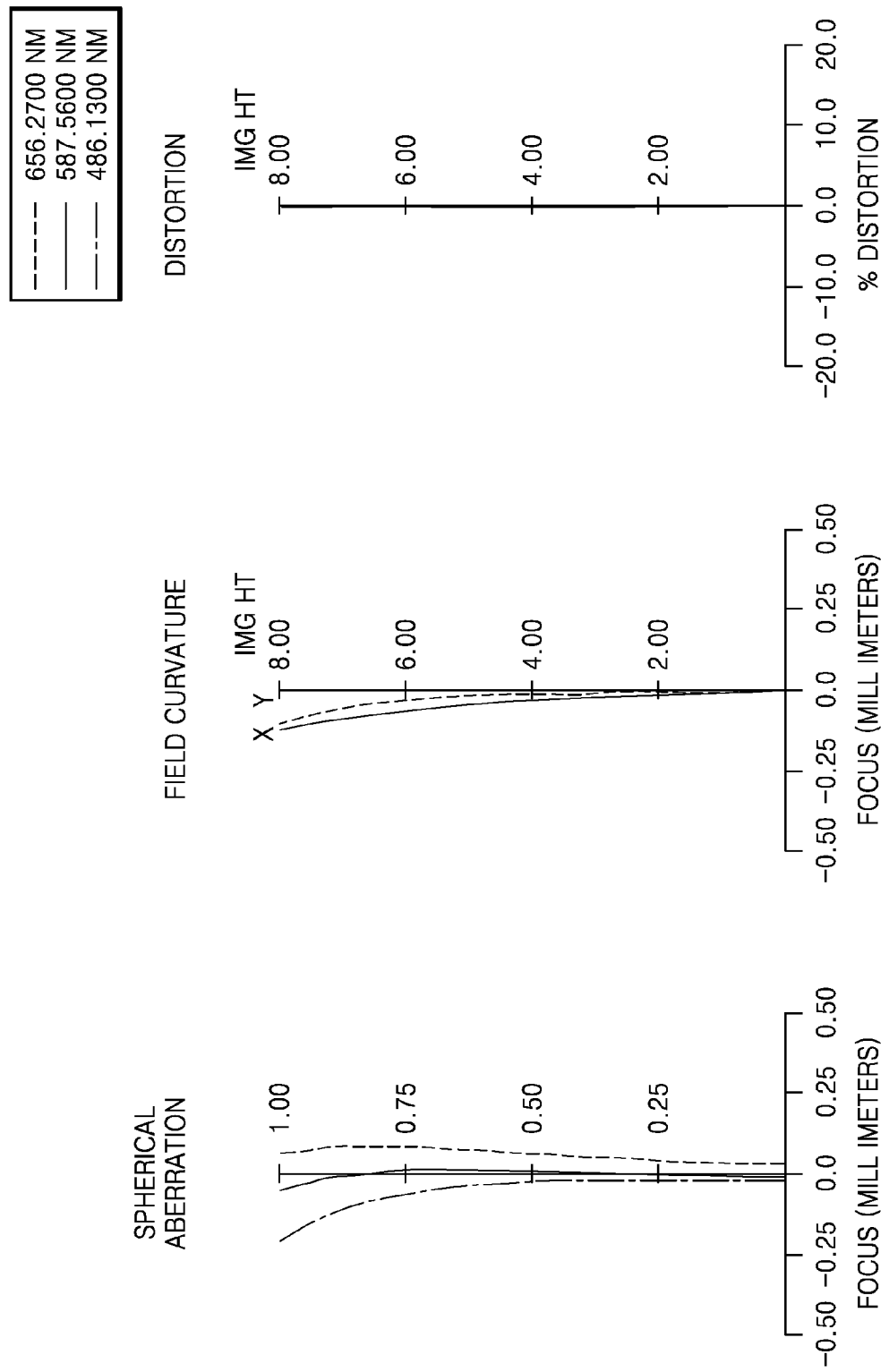

The third lens group G3 may include one or more lenses. For example, FIGS. 1, 3, 5, and 7 illustrate an example where the third lens group G3 includes an eighth positive lens 31 and a ninth negative lens 32. FIG. 9 illustrates an example where the third lens group G3 includes one positive lens. The third lens group G3 moves in a vertical direction with respect to a horizontal optical axis so as to correct vibration.

The fourth lens group G4 may include one lens. For example, the fourth lens group G4 may include a tenth positive lens 41. The fourth lens group G4 moves along the optical axis so as to correct image plane variation and to correct a focal position, thereby performing focusing. For reference, the lenses are denoted by the reference numerals in only FIG. 1.

Meanwhile, the zoom lens according to the embodiment may be configured to satisfy the following expression:

$$0.3 \leq wFno*fw/f2 \leq 1.25 \qquad \text{<Expression 1>}$$

where, f2 denotes a focal length of the second lens group, fw denotes a focal length of the whole zoom lens at the wide angle position, and wFno denotes an F number at the wide angle position.

In order to realize a bright lens, a ratio of a refractive power of the zoom lens at the wide angle position to a refractive power of the second lens group is important. Thus, a ratio of the focal length of the whole zoom lens to a focal length of the second lens group is configured according to Expression 1, thereby realizing a stabilized system according to a large diameter of the zoom lens. In Expression 1, when "wFno*fw/f2" exceeds an upper limit, the refractive power of the second lens group excessively increases, and it becomes difficult to appropriately distribute the refractive power of the third lens group, and thus it may be difficult to correct vibration. When "wFno*fw/f2" is less than a lower limit, the refractive power of the second lens group excessively decreases, and it becomes difficult to control spherical aberration according to a large diameter of a zoom lens.

Next, the zoom lens according to the embodiment may be configured to satisfy the following expression:

$$60 \leq 1Vd \leq 100 \qquad \text{<Expression 2>}$$

where, 1Vd denotes an Abbe number of a negative lens included in the first lens group.

The first lens group may include one or more negative lenses, and at least one of the negative lenses may have an Abbe number equal to or greater than 60 and equal to or less than 100. For example, the second negative lens 12 may have an Abbe number equal to or greater than 60 and equal to or less than 100. When the first lens group satisfies Expression 2, chromatic aberration may be decreased or removed.

The zoom lens according to the embodiment may be configured to satisfy the following expression:

$$1.7 \leq f3/fw \leq 21.5 \qquad \text{<Expression 3>}$$

where, f3 denotes a focal length of the third lens group, and fw denotes a focal length of the whole zoom lens at the wide angle position.

In a zoom lens having a large diameter, a zoom magnification may obstruct the control of aberration. In order to solve this problem, in the embodiment, the second lens group and the third lens group which have a positive refractive power are included, an interval between each of the lens groups is changed during zooming, and aberration may be stably controlled.

In addition, the third lens group corrects vibration, and the third lens group includes a lens having a positive refractive power, thereby reducing a variation in resolution that may occur during the correction of the vibration. The third lens group moves in a vertical direction with respect to the horizontal optical axis in order to correct the vibration, and a configuration of a mechanism for controlling the correction of the vibration may be simplified by reducing the number of lenses of the third lens group. Meanwhile, in order to improve an effect of the correction of the vibration, a stroke of the movement of the third lens group in the vertical direction with respect to the optical axis is appropriately adjusted. Expression 3 limits a refractive power of the zoom lens for preventing vibration. When f3/fw exceeds an upper limit, a stroke for correcting the vibration increases, and thus an effect of preventing the vibration is decreased. When f3/fw exceeds a lower limit, the vibration is prevented, but it is difficult to control aberration. Therefore, it may be difficult to realize the zoom lens having a large diameter.

In a zooming optical system, the fourth lens group G4 satisfies the following expression:

$$2.9 \leq f4/fw \leq 12 \qquad \text{<Expression 4>}$$

where, f4 denotes a focal length of the fourth lens group, and fw denotes a focal length of the whole zoom lens at the wide angle position.

Expression 4 limits a ratio of the focal length of the fourth lens group to the focal length of the whole zoom lens at the wide angle position. When "f4/fw" is equal to or less than a lower limit of Expression 4, the refractive power becomes excessively strong, and an amount of aberration variation increases when performing the correction of an image plane according to an object distance. When "f4/fw" exceeds an upper limit of Expression 4, a moving distance of the fourth lens group along the optical axis for the correction of the image plane increases, and thus it may be difficult to achieve the miniaturization of the zoom lens.

The first lens group may include at least one positive lens. The at least one positive lens may be configured to satisfy the following expression:

$$1.9 \leq 1Nd \qquad \text{<Expression 5>}$$

where, 1Nd denotes a d-line refractive index of the positive lens of the first lens group.

In order to increase the refractive power of the first lens group G1, a negative lens included in the first lens group may be formed as a biconcave lens, and the refractive power of the lens having a positive refractive power may be increased. The refractive power may be increased by forming the positive lens of the first lens group of a material having a refractive index of 1.9 or more. When the positive lens of the first lens group is formed of a material having a refractive index of 1.9 or less, the lens has a sharp radius of curvature, and thus it may be difficult to process the lens.

Meanwhile, the second lens group G2 may have an aspherical lens having a meniscus shape with a convex surface facing toward the object side O. When making an aperture large for realizing a bright lens, the central light flux of the second lens group is greatest compared with another lens groups, and spherical aberrations may be easily corrected by using the aspherical lens in the second lens group. In addition, in order to achieve a wide angle and a large aperture, axial aberration and off-axial aberration may be controlled by using an aspherical lens having a meniscus shape with a convex surface facing toward the object side in the second lens group.

The second lens group G2 may include a cemented lens. The cemented lens may include a positive lens and a negative lens. The second lens group includes, for example, in a sequence from the object side, a positive lens, a positive lens, a positive lens, and negative lens, thereby allowing aberration to be easily controlled. In addition, the cemented lens may correct chromatic aberration.

The third lens group G3 may include at least one aspherical lens having a positive refractive power.

In a 4-group type zoom lens, the third lens group G3 and an aperture diaphragm ST move in the same trajectory so as to correct the remaining amount of spherical aberration after the correction of the spherical aberration by the second lens group. In addition, the third lens group moves in the vertical direction with respect to the horizontal optical axis so as to correct vibration. In addition, the third lens group may control aberration and correct a Petzval sum by using an aspherical lens having a positive refractive power.

During shifting of the third lens group in order to correct the vibration, an image, spherical aberration, and the Petzval sum are satisfactorily corrected. That is, eccentric coma aberration occurring in the central portion of an image plane is suppressed when moving the lens group for correction of the spherical aberration and the vibration. In addition, a field curvature occurring in a periphery of the image plane when moving the third lens group, which is a vibration correction group, may be suppressed by correcting the Petzval sum.

In addition, since the third lens group moves together with the aperture diaphragm, a mechanical configuration for correcting vibration may be simplified, and a size of a lens barrel may be reduced. The aperture diaphragm and a shutter are disposed on the object side of the third lens group, and the aperture diaphragm and the shutter are moved in the same trajectory as the third lens group, thereby simplifying electronic control and a mechanical configuration and reducing a manufacturing cost of the whole zoom lens.

The fourth lens group G4 may perform focusing according to a variation in an object distance. The fourth lens group G4 may include a meniscus lens with a convex surface facing toward the object side. The fourth lens group G4 has a meniscus shape with a convex surface facing toward the object side, thereby allowing easy correction of a field curvature and reducing a variation in aberration according to an object distance when performing focusing.

The fourth lens group G4 may include an aspherical lens having a positive refractive power. Thus, aberration may be easily corrected, and an incident angle of a light beam incident on the image plane may be easily controlled.

In order to achieve miniaturization and a reduction in cost in a camera lens system, a lens is simply driven. When performing focusing for compensating for image plane variation according to an object distance, the focusing is performed by moving the fourth lens group, which is closest to the image plane, and thus aberration varies little according to the compensation of the image plane, and a mechanism for moving the fourth lens group may be simplified, thereby facilitating the miniaturization of the zoom lens and a reduction in cost.

Meanwhile, the definition of the aspherical surface mentioned in the embodiment is as follows.

A shape of the aspherical surface of the zoom lens according to the embodiment may be expressed by the following expression when an optical axis direction is along an x-axis, a direction perpendicular to the optical axis direction is along a y-axis, and a traveling direction of a light beam is a positive direction. Here, x denotes a distance in the optical axis direction from the apex of the lens, y denotes a distance in the direction perpendicular to the optical axis direction, K denotes a conic constant, A, B, C, and D each denote an aspherical coefficient, and c denotes an inverse of a radius of curvature R (i.e., 1/R) at the apex of the lens.

$$x = \frac{cy^2}{1 + \sqrt{1 - (K+1)c^2 y^2}} + Ay^4 + By^6 + Cy^8 + Dy^{10} \quad \langle\text{Expression 5}\rangle$$

Specifically, the miniaturization and a wide angle of the zoom lens may be realized through the embodiments according to various designs as follows.

Hereinafter, f denotes a focal length of the zoom lens, Fno denotes an F number, 2ω denotes an angle of view, R denotes a radius of curvature, Dn denotes a thickness of the center of a lens or an interval between lenses, Nd denotes a refractive index, and Vd denotes an Abbe number. In addition, ST denotes an aperture diaphragm, D1, D2, D3, D4, D5, and D6 denote a variable distance, and * denotes an aspherical surface. In each embodiment, a unit of a distance is mm. A sign P, which has not been described, may refer to a filter or a cover glass. For example, the filter may include at least one of a low-pass filter and an IR-cut filter. However, an imaging lens may be configured without a filter. In each embodiment, lens plane numbers i are sequentially applied in series from the object side O to the image side I.

<First Embodiment>

FIG. 1 is a diagram illustrating a wide angle position, a middle position, and a telephoto position of a zoom lens according to a first embodiment, and Table 1 shows design data of the first embodiment.

TABLE 1 f: 10.20~19.54~29.08; Fno: 1.21~1.81~2.52;
2ω: 76.20~44.53~30.76

| Lens Plane | Radius of Curvature | Thickness | Refractive Index(Nd) | Abbe Number(Vd) |
|---|---|---|---|---|
| 1* | −58.384 | 1.20 | 1.773 | 49.62 |
| 2* | 14.867 | 4.43 | | |
| 3 | −49.440 | 1.20 | 1.437 | 95.10 |
| 4 | 76.488 | 0.10 | | |
| 5 | 40.035 | 2.21 | 1.946 | 17.98 |
| 6 | 391.262 | D1 | | |
| 7* | 30.920 | 2.27 | 1.775 | 49.13 |
| 8* | 84.769 | 0.10 | | |
| 9 | 26.342 | 2.03 | 1.773 | 49.62 |
| 10 | 48.119 | 0.10 | | |
| 11 | 17.747 | 3.15 | 1.773 | 49.62 |
| 12 | 49.471 | 1.20 | 2.003 | 19.32 |
| 13 | 18.425 | D2 | | |
| ST | INFINITY | 2.00 | | |
| 15* | 16.557 | 4.31 | 1.862 | 37.59 |
| 16* | −32.873 | 0.30 | | |
| 17 | −426.609 | 1.58 | 1.872 | 22.51 |
| 18 | 15.832 | D3 | | |
| 19* | 22.740 | 3.33 | 1.773 | 49.62 |
| 20* | 539.406 | D4 | | |
| 21 | INFINITY | 1.00 | 1.517 | 64.20 |
| 22 | INFINITY | D5 | | |
| 23 | INFINITY | | | |

Table 2 shows data regarding an aspherical coefficient of the zoom lens according to the first embodiment.

TABLE 2

| Lens Plane | K | A | B | C | D |
|---|---|---|---|---|---|
| 1 | 0.000000 | −1.160154E−05 | 2.673509E−07 | −1.529224E−09 | 3.461526E−12 |
| 2 | −1.000000 | −3.484520E−05 | 3.201993E−07 | −9.280827E−10 | 7.831004E−13 |
| 7 | 0.000000 | −3.012654E−05 | −1.162708E−07 | 9.187050E−10 | 0.000000E+00 |
| 8 | 0.000000 | −1.757752E−05 | −1.150191E−07 | 1.103233E−09 | 0.000000E+00 |
| 15 | 0.000000 | −4.458744E−05 | −1.505571E−07 | −4.836811E−10 | 0.000000E+00 |
| 16 | 0.000000 | 4.001041E−05 | −2.656870E−07 | 7.197442E−10 | 0.000000E+00 |
| 19 | −1.000000 | 2.646640E−05 | 6.238640E−08 | −1.731331E−09 | 0.000000E+00 |
| 20 | 0.000000 | 5.120252E−05 | −3.434460E−07 | −4.119938E−10 | 0.000000E+00 |

Table 3 shows data regarding a variable distance during zooming.

TABLE 3

| Variable Distance | Wide angle position | Middle position | Telephoto position |
|---|---|---|---|
| D1 | 14.91 | 2.91 | 0.50 |
| D2 | 8.26 | 3.97 | 3.75 |
| D3 | 7.13 | 20.78 | 36.63 |
| D4 | 5.17 | 6.73 | 3.86 |
| D5 | 2.00 | 2.00 | 2.00 |

Figure 2A:
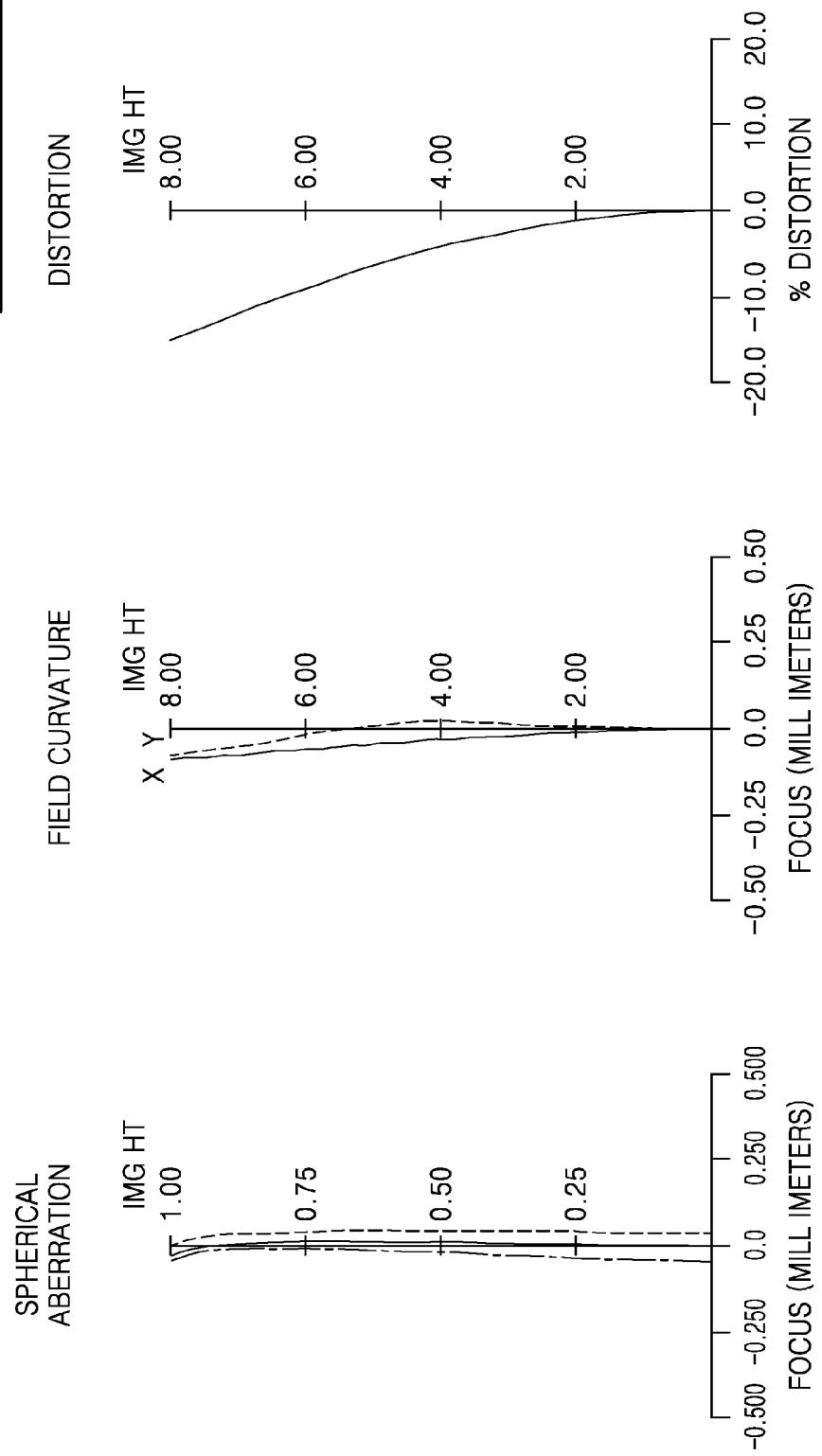
FIGS. 2A and 2B are aberration diagrams illustrating spherical aberration, field curvatures, and distortion aberration at a wide angle position and a telephoto position of the zoom lens according to the first embodiment.
Figure 2B:
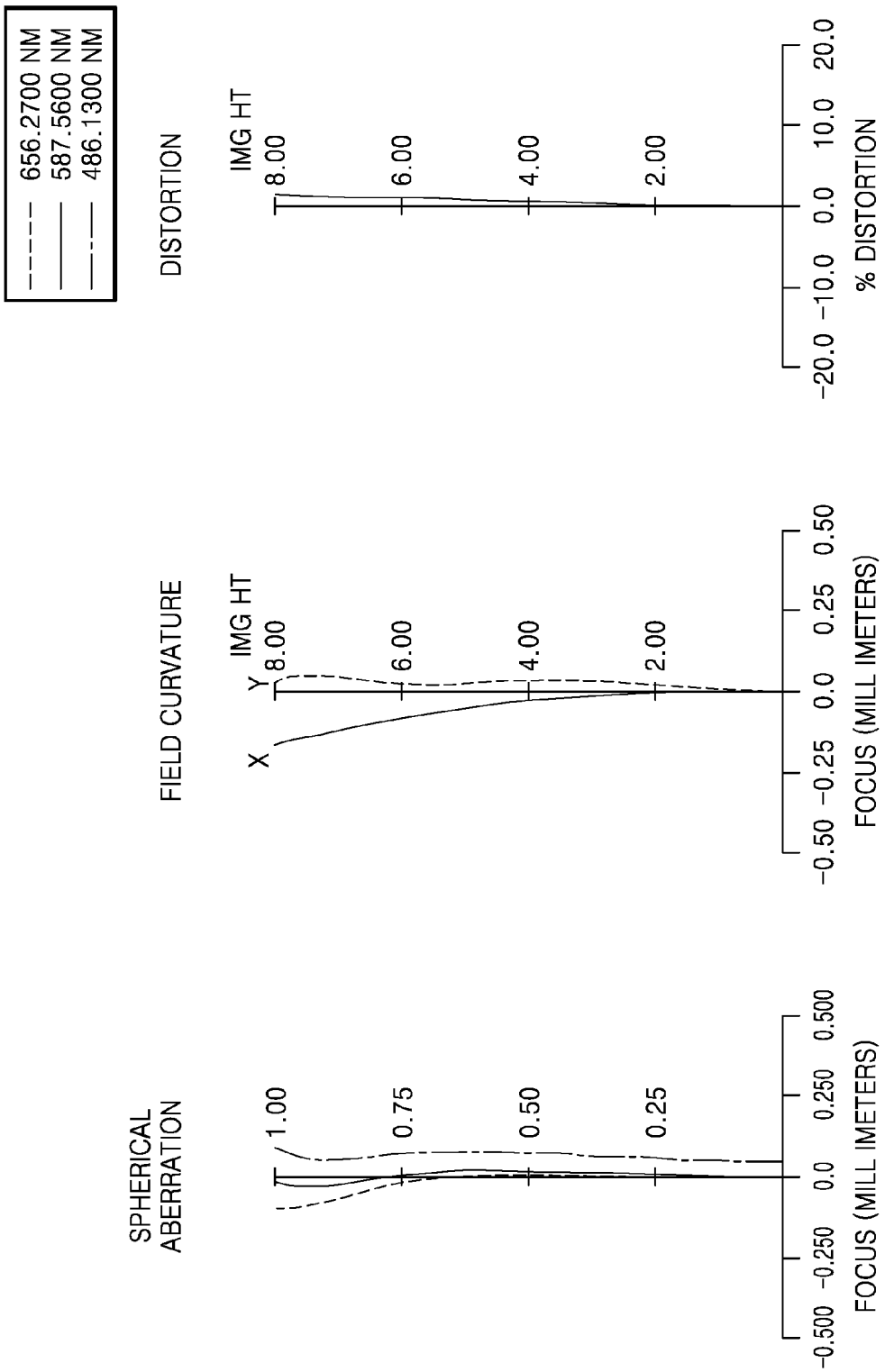

FIGS. 2A and 2B are aberration diagrams illustrating spherical aberration, field curvatures, and distortion aberration at a wide angle position and a telephoto position of the zoom lens according to the first embodiment. As the field curvature, a tangential field curvature (T) and a sagittal field curvature (S) are shown.

<Second Embodiment>

Figure 3:
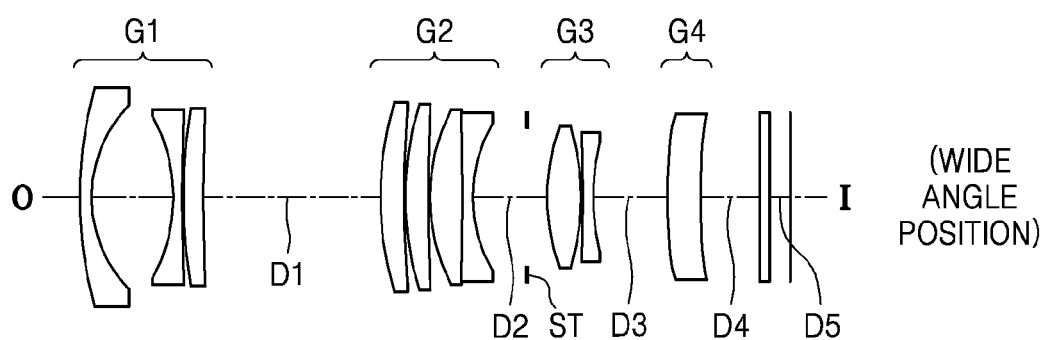
FIG. 3 is a diagram illustrating a wide angle position, a middle position, and a telephoto position of a zoom lens according to a second embodiment.
Figure 3:
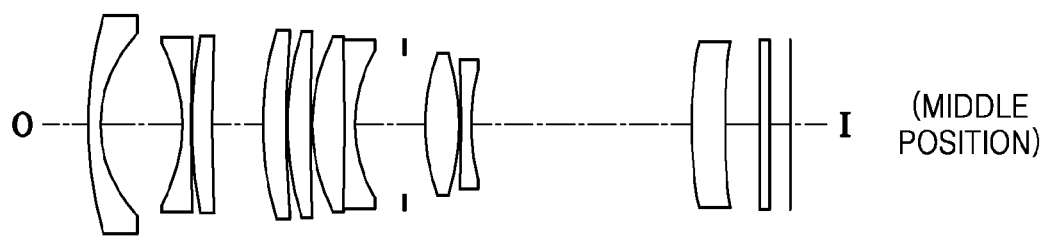
Figure 3:
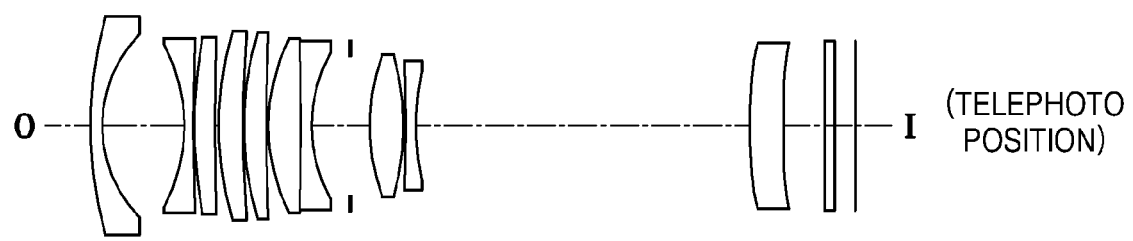

FIG. 3 is a diagram illustrating a wide angle position, a middle position, and a telephoto position of a zoom lens according to a second embodiment, and Table 4 shows design data of the second embodiment.

TABLE 4 f: 10.28~19.68~29.28; Fno: 1.62~2.42~3.33;
2ω: 75.78~44.24~30.56

| Lens Plane | Radius of Curvature | Thickness | Refractive Index(Nd) | Abbe Number(Vd) |
|---|---|---|---|---|
| 1* | 31.688 | 1.20 | 1.805 | 40.90 |
| 2* | 11.596 | 7.80 | | |
| 3 | −17.642 | 0.95 | 1.618 | 63.40 |
| 4 | 375.612 | 0.10 | | |
| 5 | 48.703 | 1.86 | 2.104 | 17.02 |
| 6 | 566.784 | D1 | | |
| 7* | 28.388 | 2.20 | 1.801 | 44.79 |
| 8* | 94.870 | 0.10 | | |
| 9 | 30.438 | 2.23 | 1.699 | 53.62 |
| 10 | 475.041 | 0.10 | | |
| 11 | 17.670 | 3.15 | 1.733 | 51.60 |
| 12 | −249.728 | 0.95 | 1.776 | 25.00 |
| 13 | 13.804 | D2 | | |
| ST | INFINITY | 2.00 | | |
| 15* | 18.380 | 3.18 | 1.772 | 1.48 |
| 16* | −21.762 | 0.20 | | |
| 17 | −102.544 | 0.95 | 1.895 | 31.46 |
| 18 | 23.796 | D3 | | |
| 19* | 56.532 | 3.15 | 1.497 | 81.61 |
| 20* | 695.791 | D4 | | |
| 21 | INFINITY | 1.00 | 1.517 | 64.20 |
| 22 | INFINITY | D5 | | |
| 23 | INFINITY | | | |

Table 5 shows data regarding an aspherical coefficient of the zoom lens according to the second embodiment.

TABLE 5

| Lens Plane | K | A | B | C | D |
|---|---|---|---|---|---|
| 1 | 0.000000 | −4.537574E−05 | 2.902638E−07 | −4.132924E−10 | −1.578666E−12 |
| 2 | −1.000000 | 7.133502E−06 | 3.822357E−07 | 1.330605E−09 | 8.846967E−12 |
| 7 | 0.000000 | −2.819543E−05 | −1.588834E−07 | 1.044827E−09 | 0.000000E+00 |
| 8 | 0.000000 | −1.375702E−05 | −1.370657E−07 | 1.347154E−09 | 0.000000E+00 |
| 15 | 0.000000 | −4.884591E−05 | −2.232370E−07 | −2.302893E−10 | 0.000000E+00 |
| 16 | 0.000000 | 4.924158E−05 | −3.655246E−07 | 8.628642E−10 | 0.000000E+00 |
| 19 | −1.000000 | 3.302662E−05 | 1.930610E−07 | 1.297914E−09 | 0.000000E+00 |
| 20 | 0.000000 | 9.649233E−05 | −1.042727E−07 | 5.409849E−09 | 0.000000E+00 |

Table 6 shows data regarding a variable distance of the zoom lens during zooming according to the second embodiment.

TABLE 6

| Variable Distance | Wide angle position | Middle position | Telephoto position |
|---|---|---|---|
| D1 | 16.99 | 4.88 | 0.50 |
| D2 | 5.21 | 4.79 | 3.75 |
| D3 | 7.13 | 21.13 | 31.94 |
| D4 | 5.54 | 3.22 | 3.86 |
| D5 | 1.00 | 1.00 | 1.00 |

Figure 4A:
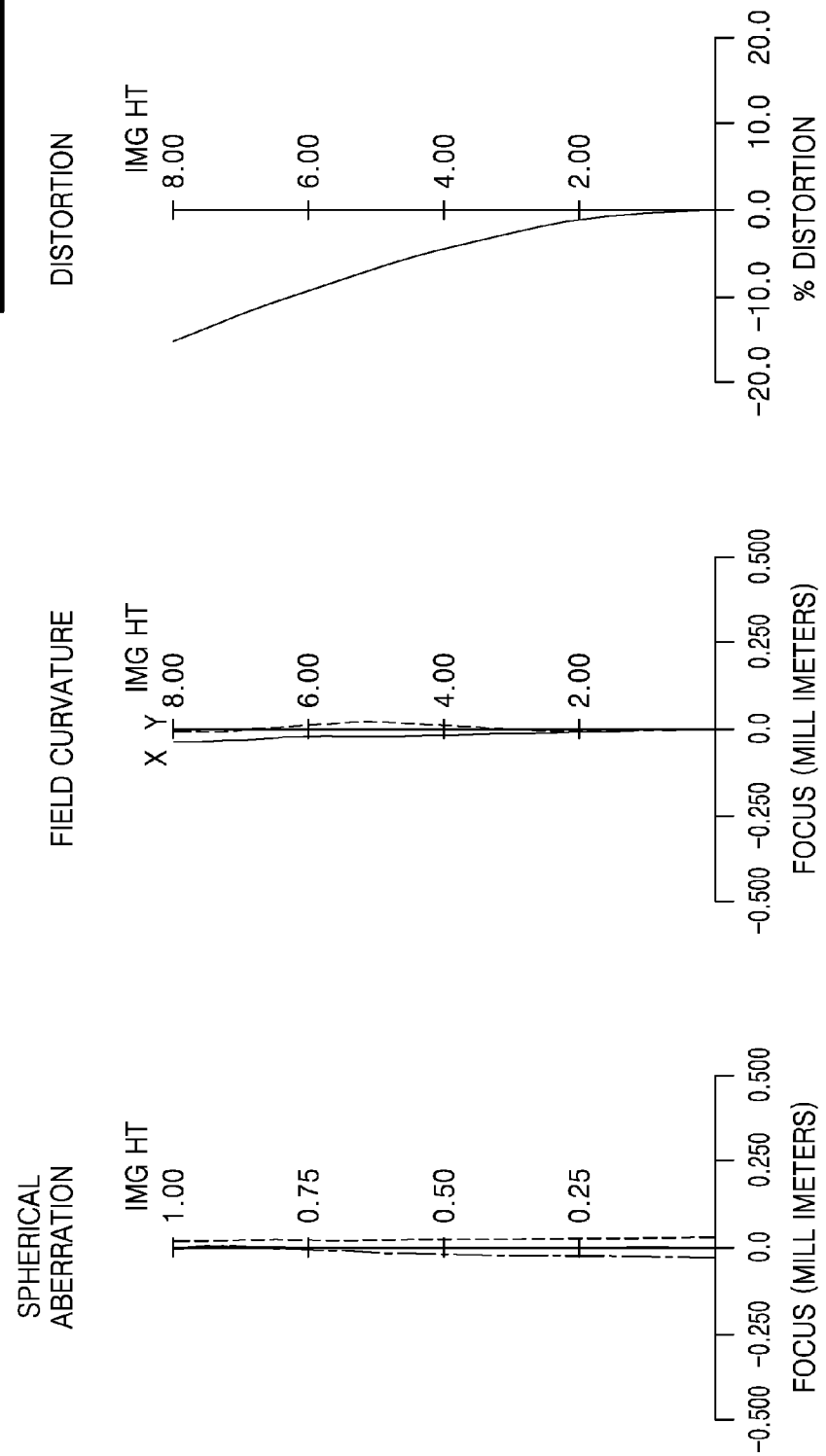
FIGS. 4A and 4B are aberration diagrams illustrating spherical aberration, field curvature, and distortion aberration at a wide angle position and a telephoto position of the zoom lens according to the second embodiment.
Figure 4B:
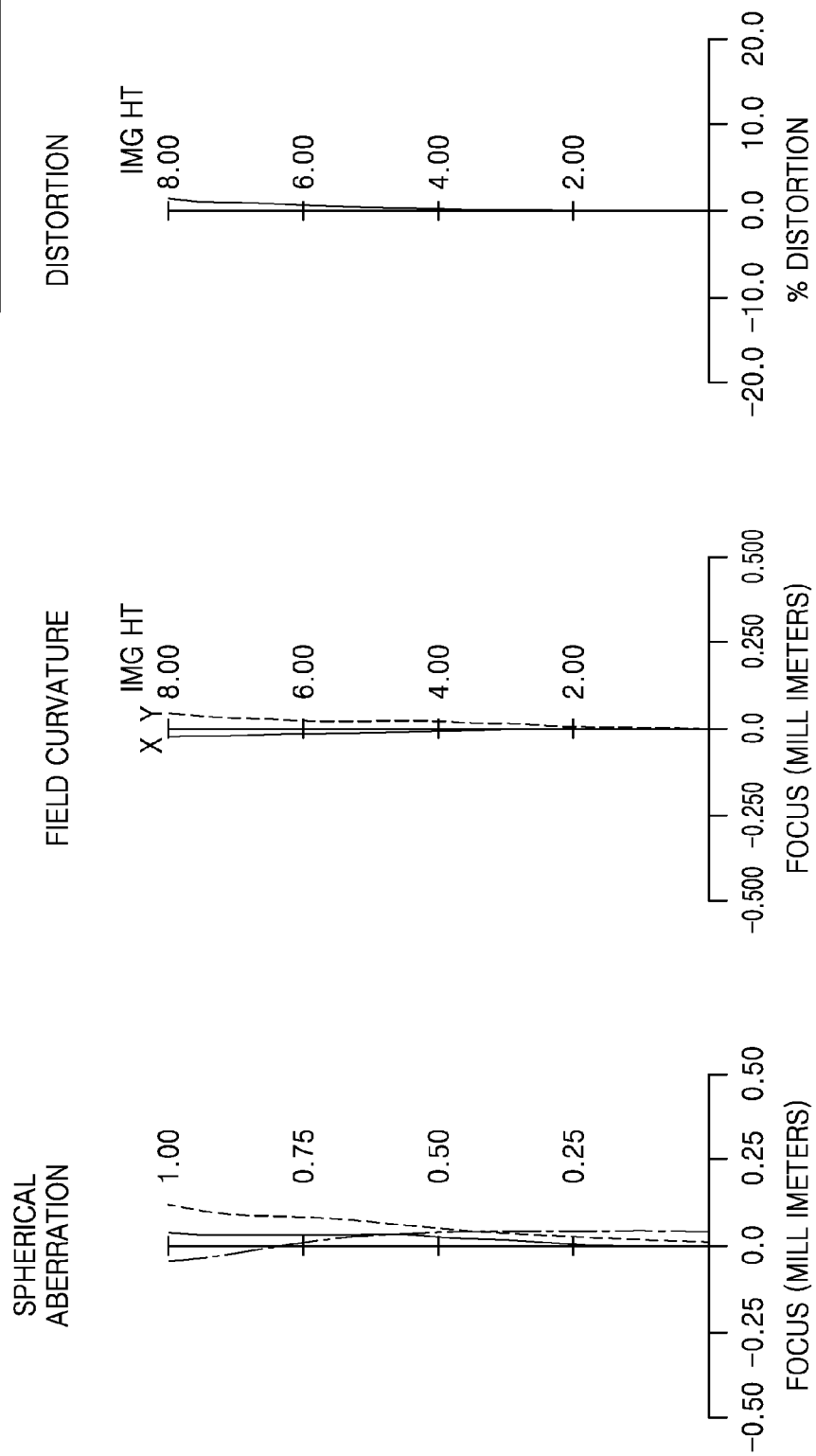

FIGS. 4A and 4B are aberration diagrams illustrating spherical aberration, field curvature, and distortion aberration at a wide angle position and a telephoto position of the zoom lens according to the second embodiment.

<Third Embodiment>

Figure 5:
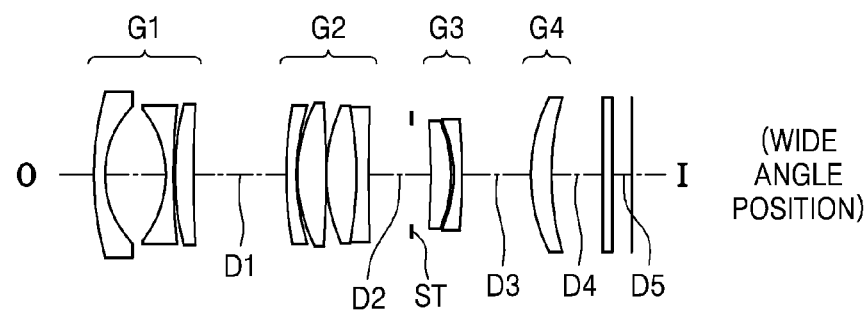
FIG. 5 is a diagram illustrating a wide angle position, a middle position, and a telephoto position of a zoom lens according to a third embodiment.
Figure 5:
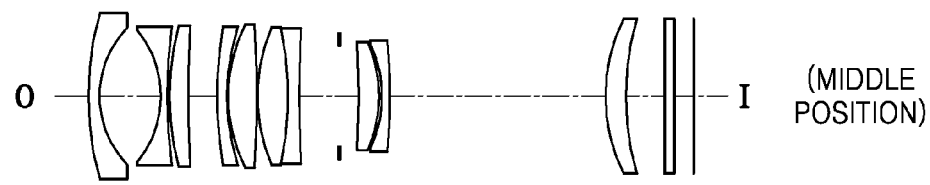
Figure 5:
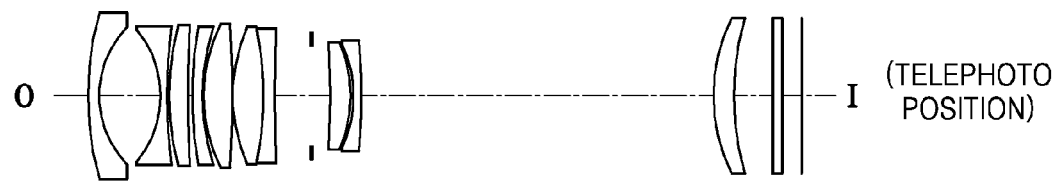

FIG. 5 is a diagram illustrating a wide angle position, a middle position, and a telephoto position of a zoom lens according to a third embodiment, and Table 7 shows design data of the third embodiment.

TABLE 7 f: 10.28~19.69~29.28; Fno: 1.80~2.93~4.07;
2ω: 75.76~44.23~30.56

| Lens Plane | Radius of Curvature | Thickness | Refractive Index(Nd) | Abbe Number(Vd) |
|---|---|---|---|---|
| 1* | 22.943 | 1.20 | 1.805 | 40.90 |
| 2* | 9.019 | 6.20 | | |
| 3 | −10.983 | 0.80 | 1.497 | 81.61 |
| 4 | 64.918 | 0.27 | | |
| 5 | 31.941 | 1.83 | 2.003 | 19.32 |
| 6 | 243.757 | D1 | | |
| 7* | 38.010 | 1.01 | 1.829 | 22.93 |
| 8* | 23.137 | 0.10 | | |
| 9 | 16.385 | 2.98 | 1.771 | 49.71 |
| 10 | −110.993 | 0.10 | | |
| 11 | 19.879 | 3.04 | 1.773 | 49.62 |
| 12 | −36.435 | 1.15 | 1.985 | 22.01 |
| 13 | 176.741 | D2 | | |
| ST | INFINITY | 2.00 | | |
| 15* | −1533.443 | 2.07 | 1.794 | 38.04 |
| 16* | −14.470 | 0.30 | | |
| 17 | −13.805 | 0.90 | 1.910 | 26.89 |
| 18 | −59.594 | D3 | | |
| 19* | 33.579 | 2.03 | 1.690 | 53.00 |
| 20* | 300.000 | D4 | | |
| 21 | INFINITY | 1.00 | 1.517 | 64.20 |
| 22 | INFINITY | D5 | | |
| 23 | INFINITY | | | |

Table 8 shows data regarding an aspherical coefficient of the zoom lens according to the third embodiment.

TABLE 8

| Lens Plane | K | A | B | C | D |
|---|---|---|---|---|---|
| 1 | 0.000000 | −1.021885E−04 | 7.337999E−08 | 8.970602E−09 | −4.652176E−11 |
| 2 | −1.000000 | −1.959686E−05 | 1.760748E−07 | 3.871842E−09 | 2.025204E−10 |
| 7 | 0.000000 | −4.333477E−05 | −5.038297E−07 | 8.034290E−09 | 0.000000E+00 |
| 8 | 0.000000 | −1.654936E−05 | −4.078503E−07 | 8.994142E−09 | 0.000000E+00 |
| 15 | 0.000000 | −1.490180E−04 | −1.123952E−06 | −8.657441E−09 | 0.000000E+00 |
| 16 | 0.000000 | −2.647187E−05 | −5.083423E−07 | 6.419597E−09 | 0.000000E+00 |
| 19 | −1.000000 | 2.666355E−04 | −2.166391E−06 | 1.527261E−08 | 0.000000E+00 |
| 20 | 0.000000 | 3.892131E−04 | −3.615831E−06 | 2.019345E−08 | 0.000000E+00 |

Table 9 shows data regarding a variable distance of the zoom lens during zooming according to the third embodiment.

TABLE 9

| Variable Distance | Wide angle position | Middle position | Telephoto position |
|---|---|---|---|
| D1 | 9.57 | 3.00 | 0.50 |
| D2 | 4.51 | 4.15 | 3.75 |
| D3 | 4.51 | 4.15 | 3.75 |
| D4 | 7.13 | 22.25 | 36.23 |
| D5 | 1.00 | 1.00 | 1.00 |

Figure 6A:
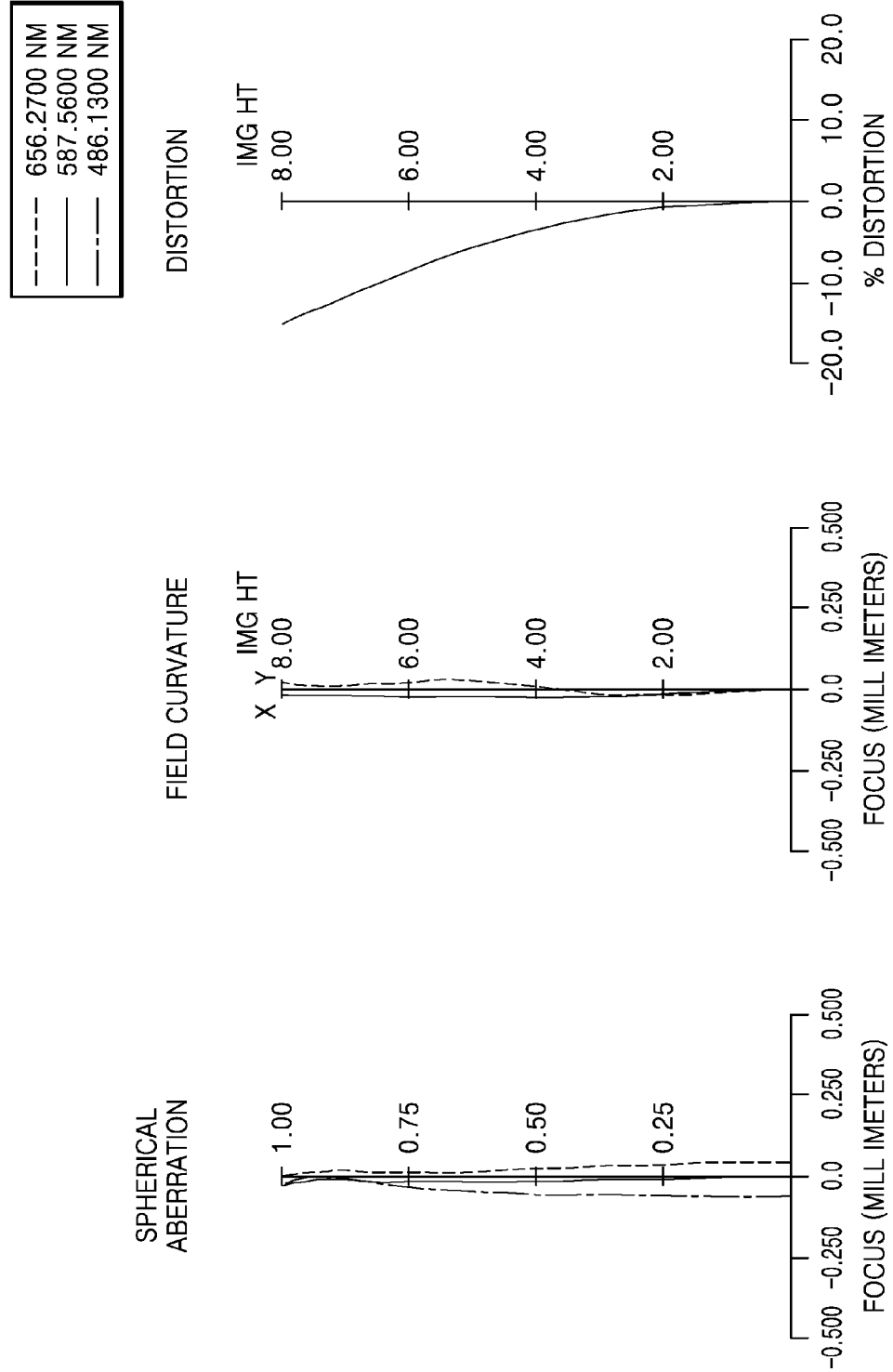
FIGS. 6A and 6B are aberration diagrams illustrating spherical aberration, field curvature, and distortion aberration at a wide angle position and a telephoto position of the zoom lens according to the third embodiment.
Figure 6B:
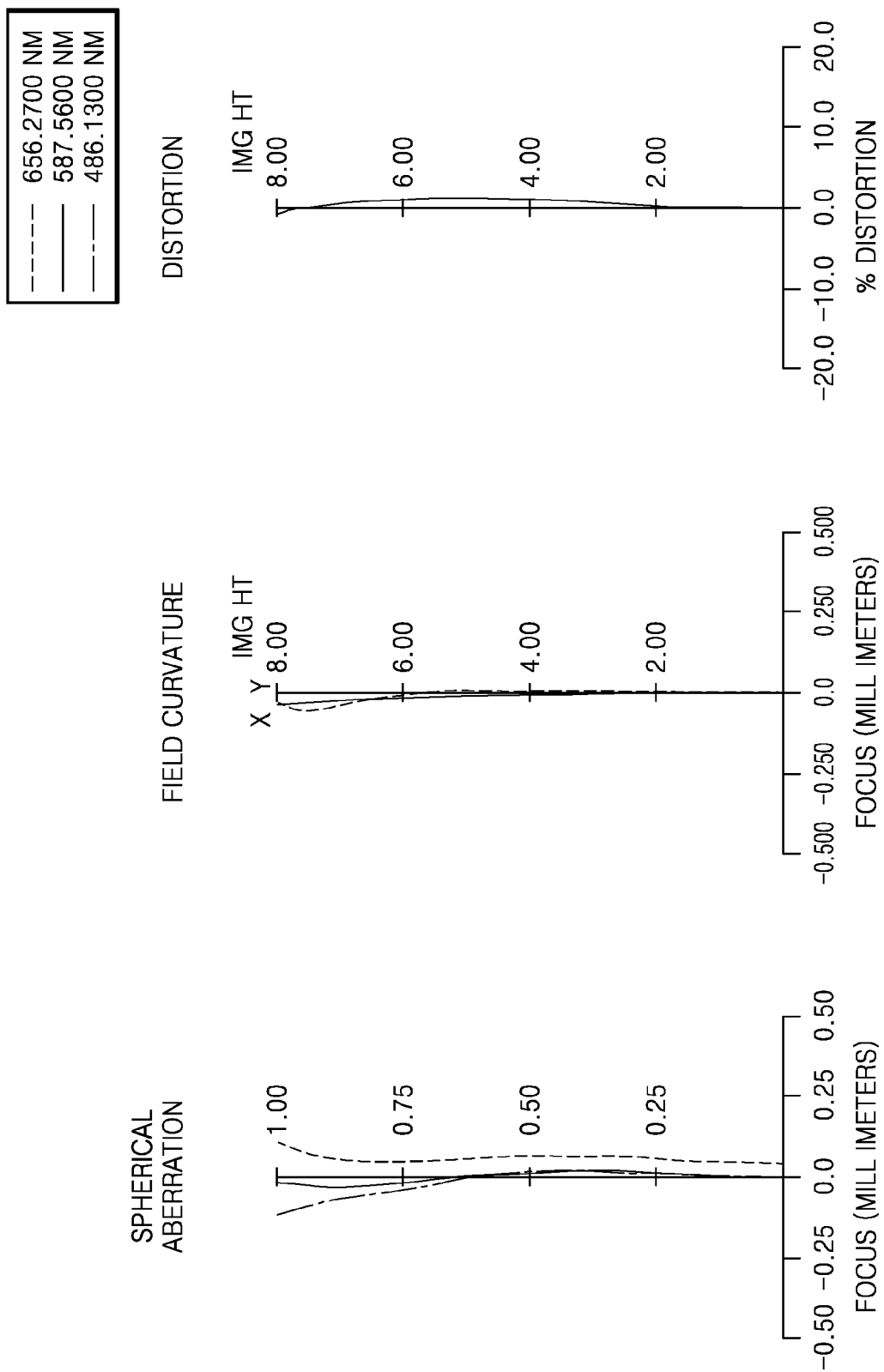

FIGS. 6A and 6B are aberration diagrams illustrating spherical aberration, field curvature, and distortion aberration at a wide angle position and a telephoto position of the zoom lens according to the third embodiment.

<Fourth Embodiment>

Figure 7:
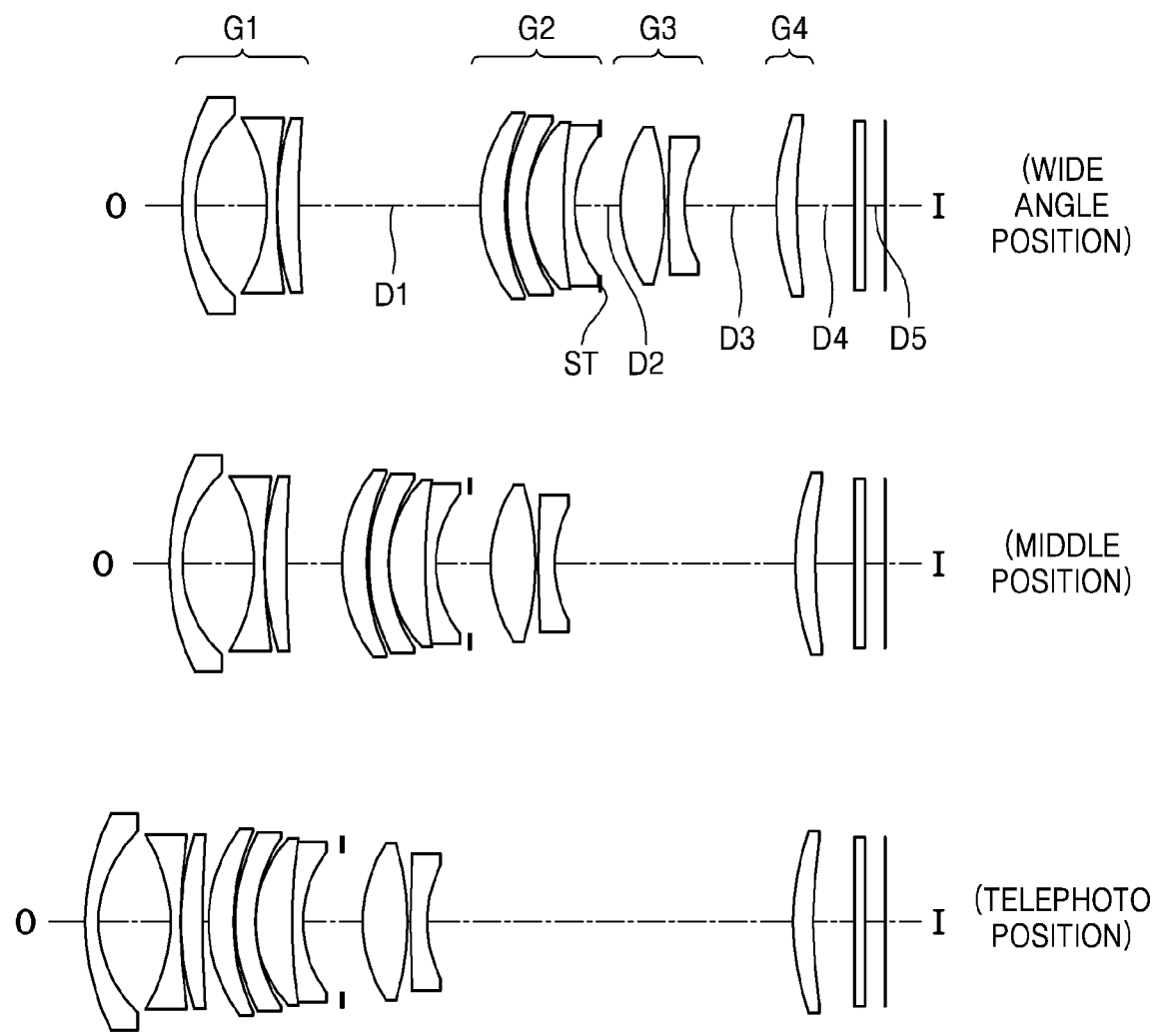
FIG. 7 is a diagram illustrating a wide angle position, a middle position, and a telephoto position of a zoom lens according to a fourth embodiment.

FIG. 7 is a diagram illustrating a wide angle position, a middle position, and a telephoto position of a zoom lens according to a fourth embodiment, and Table 10 shows design data of the fourth embodiment.

TABLE 10 f: 10.26~19.86~29.27; Fno: 1.60~2.38~3.28;
2ω: 75.84~43.86~30.57

| Lens Plane | Radius of Curvature | Thickness | Refractive Index(Nd) | Abbe Number(Vd) |
|---|---|---|---|---|
| 1* | 27.823 | 1.20 | 1.805 | 40.90 |
| 2* | 12.079 | 6.98 | | |
| 3 | −15.562 | 1.00 | 1.497 | 81.61 |
| 4 | 60.859 | 0.10 | | |
| 5 | 31.602 | 1.97 | 2.003 | 19.32 |
| 6 | 92.687 | D1 | | |
| 7* | 15.172 | 2.50 | 1.690 | 53.00 |
| 8* | 26.081 | 0.10 | | |
| 9 | 18.190 | 1.94 | 1.730 | 51.78 |
| 10 | 14.026 | 0.10 | | |
| 11 | 11.573 | 3.56 | 1.729 | 54.67 |
| 12 | 59.145 | 1.00 | 80.518 | 25.46 |
| 13 | 11.026 | D2 | | |
| ST | INFINITY | 2.00 | | |
| 15* | 11.772 | 4.37 | 1.774 | 47.17 |
| 16* | −22.319 | 0.30 | | |
| 17 | 99.584 | 1.66 | 80.543 | 27.22 |
| 18 | 13.048 | D3 | | |
| 19* | 35.490 | 1.91 | 1.690 | 53.00 |
| 20* | 300.000 | D4 | | |
| 21 | INFINITY | 1.00 | 1.517 | 64.20 |
| 22 | INFINITY | D5 | | |
| 23 | INFINITY | | | |

Table 11 shows data regarding an aspherical coefficient of the zoom lens according to the fourth embodiment.

TABLE 11

| Lens Plane | K | A | B | C | D |
|---|---|---|---|---|---|
| 1 | 0.000000 | 1.941024E−05 | 1.078908E−07 | 1.859236E−10 | −1.479016E−12 |
| 2 | −1.000000 | 7.794219E−05 | 6.632887E−07 | −3.464522E−09 | 7.535220E−11 |
| 7 | 0.000000 | −4.584480E−05 | 4.568402E−07 | 4.143129E−09 | 0.000000E+00 |
| 8 | 0.000000 | −2.461175E−05 | 8.622548E−07 | 6.005077E−09 | 0.000000E+00 |
| 15 | 0.000000 | −1.296014E−04 | −1.886323E−07 | 6.762490E−10 | 0.000000E+00 |
| 16 | 0.000000 | 6.012103E−05 | −2.428290E−07 | 3.686154E−09 | 0.000000E+00 |
| 19 | −1.000000 | 1.465147E−06 | 3.400652E−06 | −3.275539E−08 | 0.000000E+00 |
| 20 | 0.000000 | 1.873827E−05 | 4.341826E−06 | −4.243940E−08 | 0.000000E+00 |

Table 12 shows data regarding a variable distance of the zoom lens during zooming according to the fourth embodiment.

TABLE 12

| Variable Distance | Wide angle position | Middle position | Telephoto position |
|---|---|---|---|
| D1 | 17.55 | 5.40 | 0.50 |
| D2 | 2.34 | 3.20 | 3.75 |
| D3 | 8.86 | 23.29 | 35.44 |
| D4 | 5.55 | 3.64 | 3.86 |
| D5 | 1.00 | 1.00 | 1.00 |

Figure 8A:
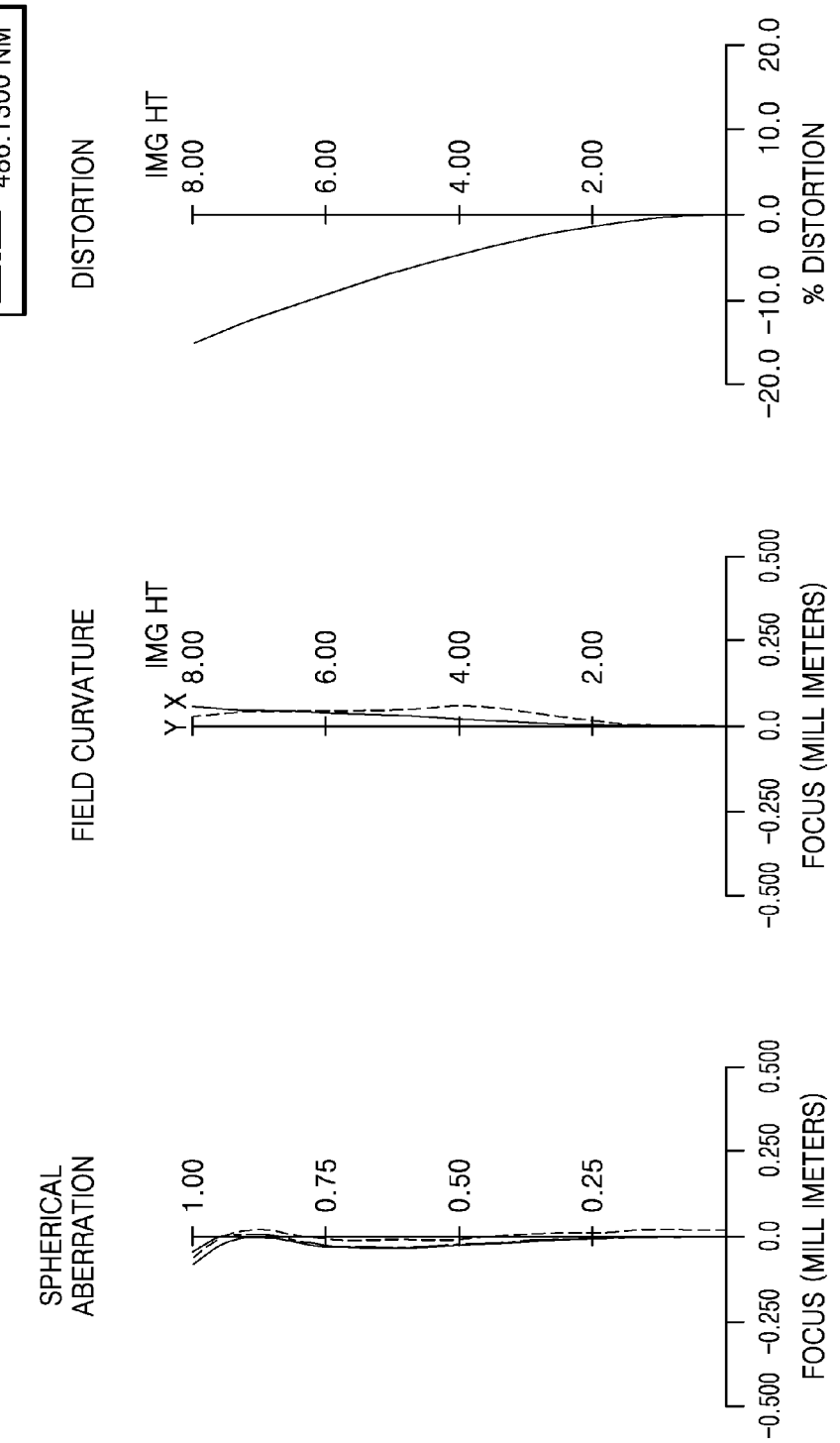
FIGS. 8A and 8B are aberration diagrams illustrating aberration at the wide angle position and the telephoto position of the zoom lens according to the fourth embodiment.
Figure 8B:
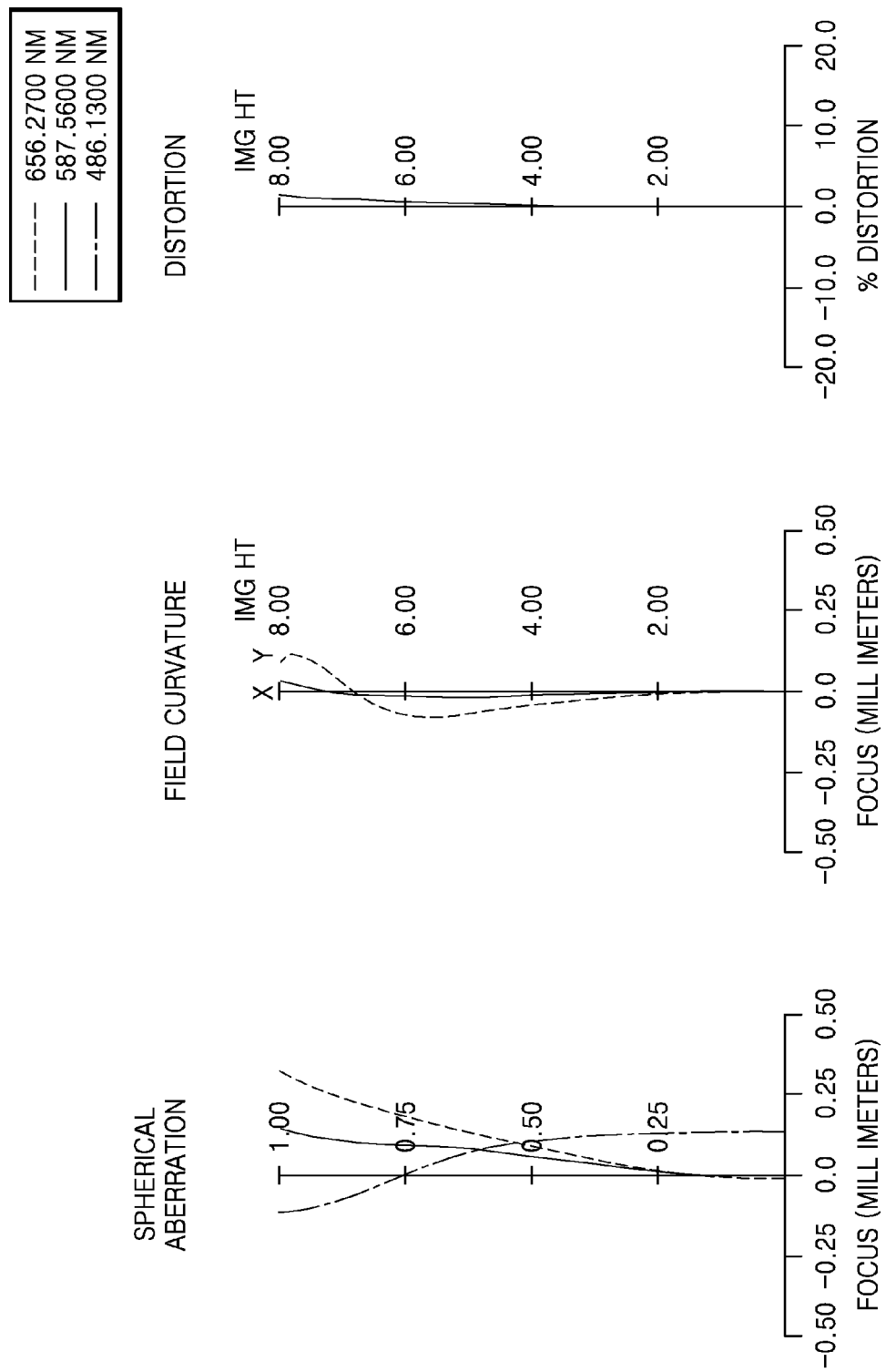

FIGS. 8A and 8B illustrate spherical aberration, field curvature, and distortion aberration at a wide angle position and a telephoto position of the zoom lens according to the fourth embodiment.

<Fifth Embodiment>

FIG. 9 is a diagram illustrating a wide angle position, a middle position, and a telephoto position of a zoom lens according to a fifth embodiment, and Table 13 shows design data of the fifth embodiment.

TABLE 13 f: 10.65~20.4~30.35; Fno: 1.47~2.55~3.49;
2ω: 73.90~44.47~29.57

| Lens Plane | Radius of Curvature | Thickness | Refractive Index(Nd) | Abbe Number(Vd) |
|---|---|---|---|---|
| 1* | 135.108 | 1.10 | 1.805 | 40.90 |
| 2* | 11.920 | 6.16 | | |
| 3 | −21.300 | 0.80 | 1.593 | 68.62 |
| 4 | −55.705 | 0.10 | | |
| 5 | 42.560 | 2.12 | 2.104 | 17.20 |
| 6 | 243.369 | D1 | | |
| 7* | 25.486 | 2.75 | 1.690 | 53.00 |
| 8* | 62.982 | 0.10 | | |
| 9 | 19.691 | 3.35 | 1.911 | 35.25 |
| 10 | 450.306 | 0.47 | | |
| 11 | 17.386 | 4.30 | 1.729 | 54.67 |
| 12 | −163.653 | 0.82 | 1.923 | 20.88 |
| 13 | 9.593 | D2 | | |
| ST | INFINITY | 1.80 | | |
| 15* | 22.520 | 2.17 | 1.771 | 47.10 |
| 16* | 303.685 | D3 | | |
| 17 | 21.908 | 2.48 | 1.719 | 52.39 |
| 18 | 84.428 | D4 | | |
| 19 | INFINITY | 0.50 | 1.517 | 64.20 |
| 20 | INFINITY | 0.50 | | |
| 21 | INFINITY | 0.50 | 1.517 | 64.20 |
| 22 | INFINITY | D5 | | |
| 23 | INFINITY | | | |

Table 14 shows data regarding an aspherical coefficient of the zoom lens according to the fifth embodiment.

TABLE 14

| Lens Plane | K | A | B | C | D |
|---|---|---|---|---|---|
| 1 | 0.000000 | −1.983463E−05 | 6.153344E−08 | −1.693740E−10 | 2.441991E−13 |
| 2 | −1.000000 | 1.190639E−05 | 1.269381E−09 | 4.512038E−11 | −2.187866E−13 |
| 7 | −0.219732 | −3.096050E−05 | −5.913782E−08 | −1.809691E−09 | 0.000000E+00 |
| 8 | 24.999521 | −2.153684E−05 | −1.034511E−07 | −1.989367E−09 | 0.000000E+00 |
| 15 | 0.000000 | 7.964711E−05 | 5.682117E−07 | 1.603637E−08 | 0.000000E+00 |
| 16 | 0.000000 | 9.895032E−05 | 5.754636E−07 | 2.168339E−08 | 0.000000E+00 |

Table 15 shows data regarding a variable distance of the zoom lens during zooming according to the fifth embodiment.

TABLE 15

| Variable Distance | Wide angle position | Middle position | Telephoto position |
|---|---|---|---|
| D1 | 18.07 | 5.03 | 0.80 |
| D2 | 6.38 | 4.22 | 3.50 |
| D3 | 7.00 | 21.82 | 35.81 |
| D4 | 5.29 | 4.93 | 4.21 |
| D5 | 1.50 | 1.50 | 1.50 |

Table 16 shows that the first to fifth embodiments satisfy the above-mentioned Expression 1 to Expression 5.

TABLE 16

| Expression | First Embodiment | Second Embodiment | Third Embodiment | Fourth Embodiment | Fifth Embodiment |
|---|---|---|---|---|---|
| 1  $0.3 \leq wFno * fw/f2 \leq 1.25$ | 0.404 | 0.626 | 1.234 | 0.300 | 0.630 |
| 2  $60 \leq 1Vd \leq 100$ | 95.100 | 63.390 | 81.605 | 81.605 | 68.624 |
| 3  $1.7 \leq f3/fw \leq 21.5$ | 3.308 | 2.870 | 21.480 | 1.700 | 2.938 |
| 4  $2.9 \leq f4/fw \leq 12$ | 2.989 | 12.000 | 5.296 | 5.639 | 3.784 |
| 5  $1.9 \leq 1Nd$ | 1.946 | 2.104 | 2.003 | 2.003 | 2.104 |

The zoom lens according to the embodiment may realize a small and bright lens. The zoom lens according to the embodiment may be applied to electronic devices such as a digital still camera, a single-lens reflex camera, a video camera, or a personal digital assistant (PDA) which uses a solid-state imaging device such as a CCD or a CMOS imaging device.

Figure 11:
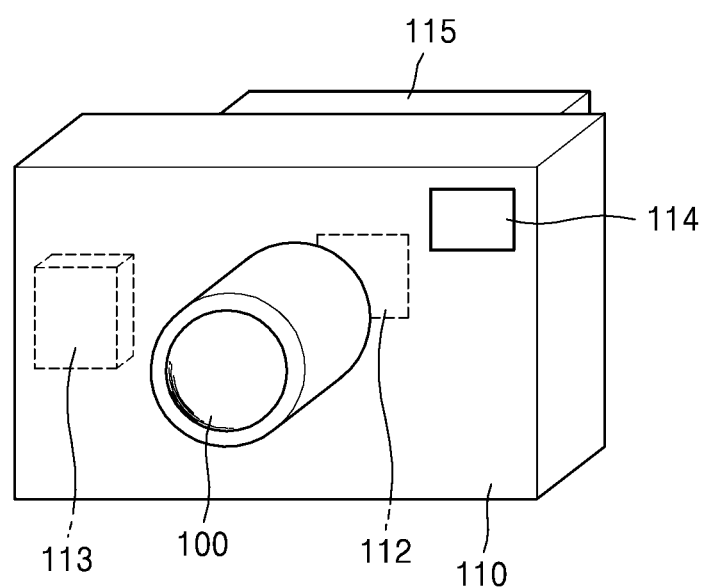
FIG. 11 is a diagram illustrating an electronic device including a zoom lens according to an embodiment.

FIG. 11 is a diagram illustrating an electronic device 110 including a zoom lens 100 according to an embodiment. The embodiments described above with reference to FIGS. 1 to 10 may be applied to the zoom lens 100. The electronic device 110 includes the zoom lens 100, and an imaging element 112 that converts light condensed by the zoom lens 100 into an electrical image signal (i.e., photoelectric conversion). The electronic device 110 may include a recording unit 113 that records information corresponding to a subject image formed by the imaging element 112 via photoelectric conversion, and a viewfinder 114 for observing the subject image. Herein, an example is shown where the viewfinder 114 and a display unit 115 are separately included, but only the display unit 115 may be included without including the viewfinder 114. The electronic device 110 illustrated in FIG. 11 is just an example, and should not be construed as limiting. The embodiments described herein may be applied to various optical and/or electronic devices such as a digital camera or a smart phone camera. An electronic device including a small, low-priced, and bright zoom lens may be provided by applying the zoom lens as described herein to an electronic device such as a digital camera or a mobile phone camera.

It should be understood that the exemplary embodiments described herein should be considered in a descriptive sense only and not for purposes of limitation. Descriptions of features or aspects within each embodiment should typically be considered as available for other similar features or aspects in other embodiments.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. Descriptions of features or aspects within each embodiment should typically be considered as available for other similar features or aspects in other embodiments unless stated otherwise. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A zoom lens comprising, in order from an object side to an image side:
    a first lens group having a negative refractive power;
    a second lens group having a positive refractive power;
    a third lens group having a positive refractive power; and
    a fourth lens group having a positive refractive power,
    wherein when zooming from a wide angle position to a telephoto position, an interval between the first lens group and the second lens group decreases, an interval between the second lens group and the third lens group decreases, and an interval between the third lens group and the fourth lens group increases,
    wherein the second lens group comprises, in a sequence from the object side, a positive lens, a positive lens, a positive lens, and a negative lens, and
    wherein the zoom lens satisfies the following expression:

$0.3 \leq wFno*fw/f2 \leq 1.25$ where, f2 denotes a focal length of the second lens group, fw denotes a focal length of the zoom lens at the wide angle position, and wFno denotes an F number at the wide angle position.

2. The zoom lens of claim 1, wherein the first lens group comprises one or more negative lenses, and at least one of the one or more negative lenses satisfies the following expression:

$60 \leq 1Vd \leq 100$ where, 1Vd denotes an Abbe number of at least one of the one or more negative lenses of the first lens group.

3. The zoom lens of claim 1, wherein the zoom lens satisfies the following expression:

$1.7 \leq f3/fw \leq 21.5$ where, f3 denotes a focal length of the third lens group, and fw denotes a focal length of the zoom lens at the wide angle position.

4. The zoom lens of claim 1, wherein the fourth lens group satisfies the following expression:

$2.9 \leq f4/fw \leq 12$ where, f4 denotes a focal length of the fourth lens group, and fw denotes a focal length of the zoom lens at the wide angle position.

5. The zoom lens of claim 1, wherein the first lens group comprises a positive lens, and a refractive index of the positive lens satisfies the following expression:

$1.9 \leq 1Nd$ where, 1Nd denotes a d-line refractive index of the positive lens of the first lens group.

6. The zoom lens of claim 1, wherein the second lens group comprises an aspherical lens having a meniscus shape with a convex surface facing toward the object side.

7. The zoom lens of claim 1, wherein the second lens group comprises a cemented lens.

8. The zoom lens of claim 1, wherein the third lens group comprises an aspherical lens having a positive refractive power.

9. The zoom lens of claim 1, wherein the third lens group performs correction of vibration.

10. The zoom lens of claim 1, wherein the third lens group comprises an aperture diaphragm.

11. The zoom lens of claim 10, wherein the third lens group and the aperture diaphragm move in a same trajectory during zooming.

12. The zoom lens of claim 1, wherein the first lens group comprises a first negative lens, a second negative lens, and a positive lens.

13. The zoom lens of claim 12, wherein the first negative lens of the first lens group is an aspherical lens.

14. The zoom lens of claim 1, wherein the third lens group comprises a negative lens and a positive lens.

15. The zoom lens of claim 1, wherein the third lens group comprises one positive lens.

16. The zoom lens of claim 1, wherein the fourth lens group comprises an aspherical lens having a positive refractive power.

17. The zoom lens of claim 1, wherein the fourth lens group comprises a meniscus lens with a convex surface facing toward the object side.

18. The zoom lens of claim 1, wherein the fourth lens group performs focusing.

19. A photographing device comprising:
a zoom lens; and
an imaging element that receives an image formed by the zoom lens,
wherein the zoom lens comprises, in order from an object side to an image side, a first lens group having a negative refractive power, a second lens group having a positive refractive power, a third lens group having a positive refractive power, and a fourth lens group having a positive refractive power,
wherein when zooming from a wide angle position to a telephoto position, an interval between the first lens group and the second lens group decreases, an interval between the second lens group and the third lens group decreases, and an interval between the third lens group and the fourth lens group increases,
wherein the second lens group comprises, in a sequence from the object side, a positive lens, a positive lens, a positive lens, and a negative lens, and
wherein the zoom lens satisfies the following expression:

$$0.3 \leq wFno*fw/f2 \leq 1.25$$

where, f2 denotes a focal length of the second lens group, fw denotes a focal length of the zoom lens at the wide angle position, and wFno denotes an F number at the wide angle position.

20. The photographing device of claim 19, wherein the first lens group comprises one or more negative lenses, and at least one of the one or more negative lenses satisfies the following expression:

$$60 \leq 1Vd \leq 100$$

where, 1Vd denotes an Abbe number of at least one of the one or more negative lenses of the first lens group.

21. The photographing device of claim 19, wherein the zoom lens satisfies the following expression:

$$1.7 \leq f3/fw \leq 21.5$$

where, f3 denotes a focal length of the third lens group, and fw denotes a focal length of the zoom lens at the wide angle position.

* * * * *